United States Patent [19]

Collins

[11] Patent Number: 4,770,858

[45] Date of Patent: Sep. 13, 1988

[54] RESILIENT DIELECTRIC ELECTRODE FOR CORONA DISCHARGE DEVICES

[75] Inventor: Wayne M. Collins, Oconomowoc, Wis.

[73] Assignee: Pillar Technologies, Inc., Hartland, Wis.

[21] Appl. No.: 40,556

[22] Filed: Apr. 17, 1987

[51] Int. Cl.⁴ .............................................. B01J 19/08
[52] U.S. Cl. .......................... 422/186.18; 422/186.07; 422/907; 204/290 R
[58] Field of Search ...................... 422/186.07, 186.18, 422/907, 186.19, 186; 204/290 R, 176

[56] References Cited

U.S. PATENT DOCUMENTS

| | | | |
|---|---|---|---|
| 3,364,129 | 1/1968 | Aemer et al. | 422/186.19 |
| 3,734,846 | 5/1973 | McNabney et al. | 422/186.07 |
| 4,159,971 | 7/1979 | Gneupel | 422/186.19 |
| 4,214,995 | 7/1980 | Saylor | 422/186.18 |
| 4,383,976 | 5/1983 | Notaro | 422/186.18 |
| 4,603,031 | 7/1986 | Gelbman | 422/186.18 |
| 4,650,648 | 3/1987 | Beer et al. | 422/186.07 |
| 4,654,199 | 3/1987 | Gloor et al. | 422/186.19 |
| 4,656,010 | 4/1987 | Leitzke et al. | 422/186.18 |
| 4,690,803 | 9/1987 | Hirth | 422/186.18 |

FOREIGN PATENT DOCUMENTS

| | | |
|---|---|---|
| 3128746 | 2/1983 | Fed. Rep. of Germany ............... 422/186.07 |
| 0260402 | 12/1985 | Japan ............................... 422/186.07 |

Primary Examiner—John F. Terapane
Assistant Examiner—Susan Wolffe
Attorney, Agent, or Firm—Ronald E. Barry

[57] ABSTRACT

An electrode for an ozone generator of the type having a high tension electrode and a grounded electrode mounted in a spaced relation, one of the electrodes having a dielectric member applied to or mounted on one of the surfaces of the electrode, the dielectric member, including a layer of resilient dielectric material having a coating of particles of an inorganic material either sprinkled on or embedded in the surface of said dielectric material facing the other electrode.

20 Claims, 3 Drawing Sheets

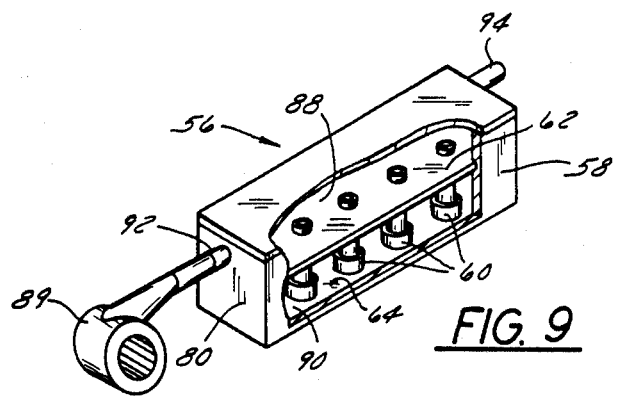
FIG. 9
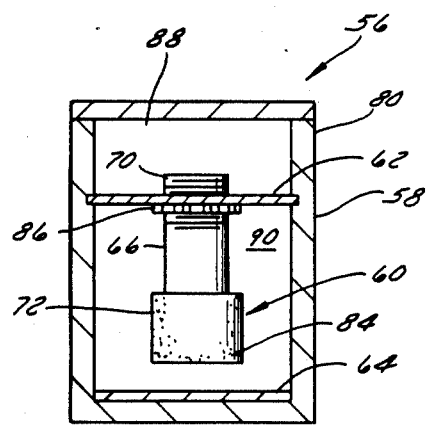
FIG. 10
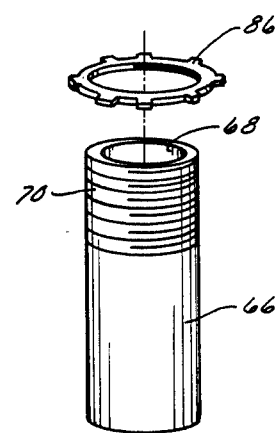
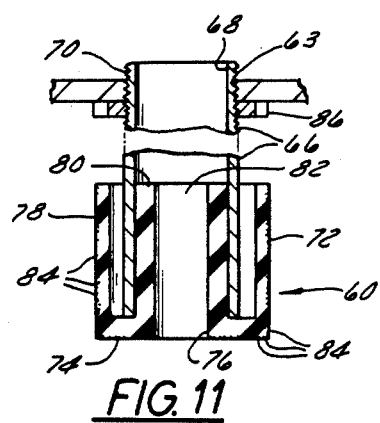
FIG. 11
FIG. 12

RESILIENT DIELECTRIC ELECTRODE FOR CORONA DISCHARGE DEVICES

BACKGROUND OF INVENTION

The present invention is concerned with devices which generate ozone for numerous industrial applications such as oxidation of cyanide in electroplating waste, decolorization of dye stuffs, purification of refining waste water, disinfection of seawaters, treating paper for printing, water purification, odor control in sewage treatment and sterilization. Ozone generators commonly used today employ the corona discharge principle. This technique utilizes a high tension electrode and a ground electrode mounted in a spaced relation with a vitreous dielectric member covering one of the electrodes. The electrodes are connected to an electric power source to set up an electrostatic field or corona in the space between the dielectric material and one of the electrodes. An oxygen-containing gas (air or oxygen) is then passed through the space between the dielectric material and electrode.

Creation of the electric discharge field requires considerable expenditure of electrical energy. More than 80% of the electrical energy applied to the electric discharge field is converted to heat and, if this is not quickly removed from the electrostatic field, it will cause rapid decomposition of the product ozone back to oxygen. The rate of this reversal reaction increases rapidly above 35° C. and is almost instantaneous at temperatures in the range of 200° C. The dielectric member is generally in the form of a solid vitreous material such as glass, fused quartz or ceramic. Heat builds up in the vitreous dielectric material so that the material generally operates at temperatures approaching the critical 200° to 250° C. range. Proper cooling of the ozone generator is therefore critical to maintaining a practical operating efficiency and consistent yields of ozone. The temperature is usually maintained at approximately 100° to 150° C. by circulating air or oil along the back of the electrodes in order to cool the dielectric member. The vitreous materials are also very fragile requiring special handling both in manufacture as well as use.

SUMMARY OF THE INVENTION

The present invention relates to ozone generators, either of an elongate or segmented type, and more particularly to an improved dielectric member which is disposed between the electrodes used in such generators. The ozone generator includes a high tension electrode and a grounded electrode. The dielectric member is provided on one of the electrodes so that the electrostatic field is produced between the dielectric member and the other electrode. The dielectric member is formed from a resilient elastomeric material having particles of inorganic material embedded in the surface of the elastomeric material. The elastomeric material can be either molded on or mounted on the surface of the electrode. The inorganic material can be either sprinkled on or embedded in the surface of the resilient elastomeric material. The use of the resilient material reduces the operating temperature range to 50° C. resulting in a substantial increase in the efficiency of ozone production. The material is also strong and does not require any special handling either in manufacture or use.

DESCRIPTION OF THE DRAWINGS

FIG. 9 is a perspective view partly broken away of a segmented type of ozone generator.

FIG. 10 is an end view in cross section of the ozone generator of FIG. 9.

FIG. 11 is a cross section view of one of the electrode segments.

FIG. 12 is an exploded perspective view of one of the electrode segments.

DESCRIPTION OF THE INVENTION

Figure 1:
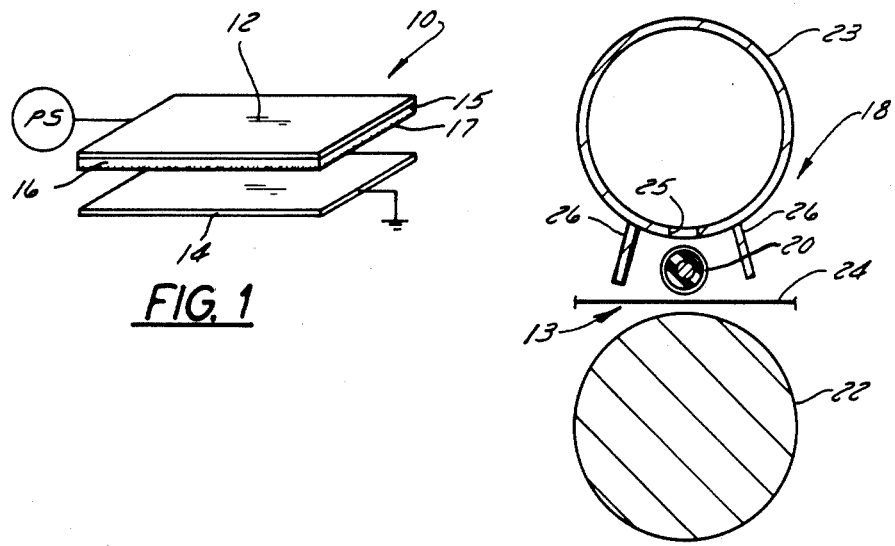
FIG. 1 is a schematic view of a typical ozone generator.

As shown in FIG. 1, ozone generators 10 of the type contemplated herein generally include a generating chamber 13 defined by means of a high tension electrode 12 and a grounded electrode 14. A dielectric member 16 is provided either on the high tension electrode 12 or the grounded electrode 14. An electrostatic field or corona discharge is created between the electrodes by connecting an electrical power source PS to the high tension electrode 12. Air or oxygen is then passed between the electrodes to discharge ozone produced in the discharge field between the electrodes. The dielectric member 16 according to the invention is formed from an elastomeric material 15 having particles of inorganic material 17 on the surface of the resilient dielectric material facing the other electrode.

Figure 4:
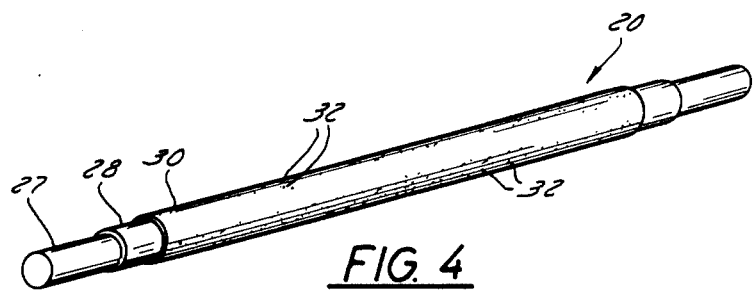
FIG. 4 is a perspective view of one of the high tension electrodes of FIG. 2 showing the improved dielectric member according to the invention in the form of a sleeve surrounds the electrode.
Figure 5:
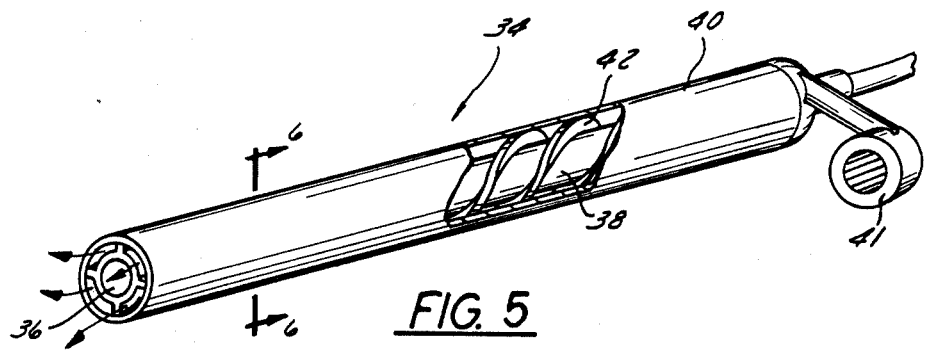
FIG. 5 is a perspective view of another form of ozone generator having a cylindrical high tension electrode supported within a tubular grounded electrode with the dielectric member mounted on the high tension electrode.
Figures 7, 8:
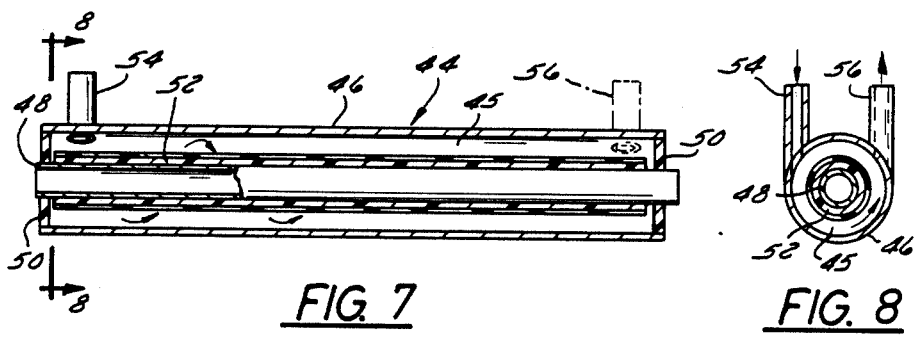
FIG. 7 is a front elevation view in cross section of another form of an ozone generator having a cylindrical electrode supported in a tubular housing which is open at both ends.
FIG. 8 is a cross sectional view taken on line 8—8 of FIG. 7 showing one of the ozone generator segments shown in FIG. 7.

In this regard, the resilient dielectric member 16 is formed from an elastomeric organic compound such as silicon rubber, HYPALON or an epoxy. The elastomeric material 16 can be made in the form of a plate as seen in FIG. 1, a sleeve as seen in FIGS. 4, 5 or 7, or a cup as seen in FIG. 12.

The inorganic material 17 can be of either a ceramic formed from a metal oxide such as aluminum oxide or silica. In either case, particles of the inorganic material are coated on the surface of the dielectric material or embedded in the surface of the dielectric material. The particles of inorganic material 17 should cover the entire surface of the resilient dielectric material 15. It has been found that the electrostatic field is produced between the particles of inorganic material and the bare electrode. The heat generated is then limited to the thin layer of the particles of inorganic material. The resiliant dielectric material acting as a thermal insulator. The heat generated in this thin layer of particles of inorganic material is dissipated by the flow of air or oxygen passing through the space between the electrodes.

In this regard, the inorganic material can be formed on the surface of the resilient dielectric material by covering the elastomeric material with a layer of uncured silicon rubber. The particles of inorganic material are then sprinkled, sprayed or pressed into the layer of uncured silicon rubber. The rubber is allowed to cure with the points of the particles of inorganic material protruding from the surface of the dielectric material.

When the dielectric material is subjected to corona, the dielectric material around the inorganic material will erode away due to the electrostatic field which will expose the particles of inorganic material resulting in the formation of a layer of inorganic material of irregular contour on the surface of the dielectric material. Corona has a preference for the exposed points of the particles of inorganic material. As the dielectric material erodes away, the irregular surface formed by the particles of inorganic material will be sufficiently exposed to absorb all of the corona and thereby stop further erosion of the dielectric material.

The heat produced by the production of corona in the ozone generator is absorbed by the particles of inorganic material. Heat build up occurs only in the particles of inorganic material, the silicon rubber acts as a thermal insulator. The normal flow of air through the generator is sufficient to dissipate this heat build up so that the generator operates at a much cooler temperature.

Figure 2:
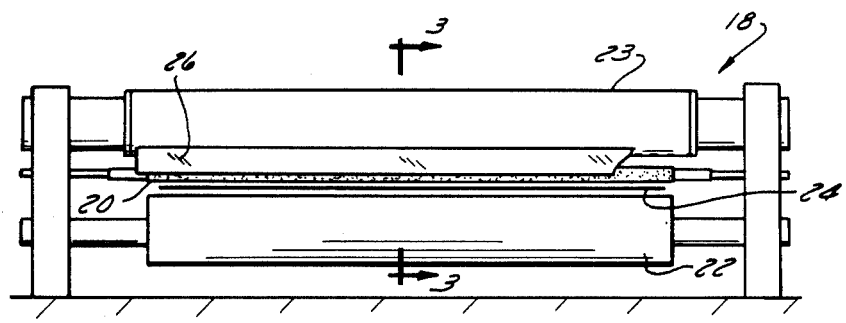
FIG. 2 is a front elevation view of an ozone generator in the form of a corona treater station having a cylindrical high tension electrode spaced from a bare roll electrode.
Figure 3:
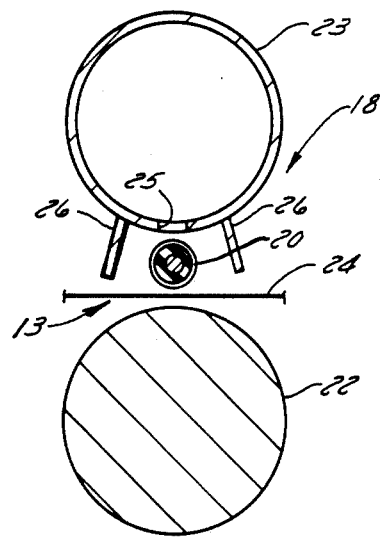
FIG. 3 is a view taken on line 3—3 of FIG. 2 showing the spacing between the cylindrical electrode and the bare roll electrode.

Ozone generators are used for many treating applications where ozone is used to treat a particular product. In FIGS. 2, 3 and 4 the ozone generator 18 shown is in the form of a corona treating station of the type used to treat the surface of a sheet of plastic film 24 so that the printing characteristic of the film is improved. The generator 18 includes a high tension electrode 20 and a grounded bare roll electrode 22. The electrode 20 is supported by means of an exhaust plenum or housing 23 having exhaust ports 25 and shielded by plates 26. An A.C. power source not shown is connected to the high tension electrode 20 and the bare roll electrode 22 is grounded. Air is drawn around the electrode 20 for discharge into the plenum through exhaust ports 25. A strip of film 24 is passed through the electrical discharge field produced in the space between the electrodes 20 and 22. This type of treatment is common in the treatment of plastic films for printing.

The high tension electrode 20 in this type of generator includes an electrically conductive rod 27 having a sleeve 28 of resilient elastomeric material, a layer 30 of uncured elastomeric material coated on the sleeve 28 and a layer of particles of inorganic material 32 embedded in the surface of the uncured material. The particles of inorganic material 32 can be rolled into the surface of the sleeve 28 or sprinkled on the layer 30 of uncured elastomeric material which is allowed to cure in order to hold the particles of inorganic material in place.

Figure 6:
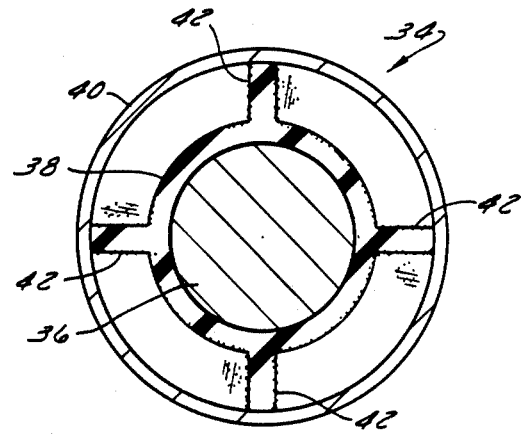
FIG. 6 is a cross sectional view taken on line 6—6 of FIG. 5 showing a spacer located between the cylindrical electrode and tubular grounded electrode.

In FIGS. 5 and 6 an ozone generator 34 is shown having a generating chamber 35 through which a stream of air is passed in order to blow the ozone into the area to be treated. The generating chamber 35 is defined by means of an electrically conductive tubular electrode 36 having a resilient dielectric member 38 in the form of a sleeve as described above. An electrically conductive hollow metal electrode 40 is supported in a spaced relation to the electrode 36 by means of a series of spirally wound dielectric spacers 42. A power source as described above is connected across the electrode 36 and 40 to produce ozone in the channels formed in the space between the electrodes. Air is then blown through the generator by means of a blower 41 mounted on the end of electrode 40 to discharge the ozone either into or onto the product or material to be treated.

In FIGS. 7 and 8, an ozone generator 44 is shown having a generating chamber 45, defined by means of a tubular electrically conductive housing 46 having a tubular high tension electrode 48 supported by insulating end plates 50 in housing 46. A dielectric member 52 in the form of a sleeve is mounted on the tubular electrode 48. An inlet pipe 54 is provided at one end of the housing 46 and an outlet pipe 56 is provided on the other end of the opposite side of the electrode 48. Air is blown through pipe 54 which by means of a motor 55 circulates around the electrode 48 and exit through pipe 56.

In FIGS. 9, 10, 11 and 12, a segmented type ozone generator 56 is shown which includes an insulating housing 58 having a number of high tension electrodes 60 mounted in a conductive plate 62 and in a spaced relation to a grounded electrode 64. Each of the electrodes 60 as seen in FIGS. 10 and 11 includes an electrically conductive tubular member 66 having an axial passage 68 and a threaded section 70 at one end. A cup-shaped resilient dielectric member 72 is mounted on the other end of the member 66. The cup-shaped member 72 is formed of elastomeric material and includes a base 74 having an opening 76 and a cylindrical wall 78. A tubular member 80 having an axial passage 82 is formed on the center of the base 74 with the opening 76 in alignment with the passage 82. A layer of particles of inorganic material 84 is provided on the outer surface of the base and cylindrical walls of the cup-shaped member 72.

The electrodes 60 are adjustably supported in plate 62 by means of a lock nut 86 mounted on the threaded end 70 of tube 66. The threaded end 70 of the tube 66 being received in a threaded opening 63 in the plate 62. The tube 66 can be moved up or down in the plate and locked in position by nut 86. The plate 62 separates the housing 58 into an air compartment 88 and an ozone generating chamber 90. Air is blown into the compartment 88 by a blower 89 through inlet passage 92 and exits through the passages 68 in the electrodes 66 into compartment 90. The air discharged from passage 68 impinges on electrode 60 and forces the ozone generated in compartment 90 out through discharge passage 94.

The embodiments of the invention in which an exclusive property or privilege is claimed are defined as follows:

1. An electrode for an ozone generator, said electrode comprising an electrically conductive member and a resilient dielectric member covering the outer surface of said conductive member, said resilient dielectric member being formed from a thermally insulating elastomeric material and an inorganic material, said inorganic material consisting of a coating of particles of inorganic material embedded in the outer surface of said thermally insulating elastomeric material.

2. The electrode according to claim 1 wherein said elastomeric material is silicon rubber.

3. The electrode according to claim 1 wherein said conductive member is cylindrical in form and said dielectric member is in the form of a hollow dielectric sleeve made of said elastomeric material which closely fits the outer surface of said conductive member.

4. The electrode according to claims 1, 2 or 3 wherein said inorganic material is aluminum oxide.

5. The electrode according to claims 1, 2 or 3 wherein said inorganic material comprises particles of ceramic material.

6. An ozone generator comprising a grounded conductive member and a high tension conductive member supported in a spaced relation to said grounded member, a resilient dielectric member covering the surface of one of said conductive members, said dielectric member facing the other of said conductive members, said dielectric member including a layer of thermally insulating elastomeric material and a coating of particles of inorganic material embedded in the surface of said elastomeric material facing the other of said members, said high tension conductive member being connected to an electrical power source and the other of said members being connected to ground whereby an electrostatic field is created between said coating of inorganic material and the other of said members and means for passing air through said electrostatic field to discharge the ozone produced in said electrostatic field from the generator.

7. The device according to claim 6 wherein said elastomeric material is silicon rubber.

8. The device according to claim 6 or 7 wherein said inorganic material comprises silica particles.

9. The device according to claim 6 or 7 wherein said inorganic material comprises particles of ceramic material.

10. The device according to claim 6 wherein one of said conductive members is tubular and the other of said conductive members is a hollow cylinder.

11. The device according to claim 10 including means for supporting said cylinder in a spaced relation to said tubular member.

12. The device according to claim 10 or 11 wherein said elastomeric material is silicon rubber.

13. The device according to claim 12 wherein said inorganic material comprises particles of ceramic.

14. In an ozone generator having
a high tension electrode and a grounded electrode mounted in a spaced relation to said high tension electrode and including means for passing air or oxygen through the space between the electrodes, the improvement comprising
a resilient dielectric member mounted on one of said electrodes,
said member being formed of a layer of thermally insulating elastomeric material having a covering of inorganic material on the surface of the elastomeric material facing the other of said electrodes.

15. The generator according to claim 14 wherein said elastomeric material is silicon rubber.

16. The member according to claim 14 wherein said inorganic material is in the form of a powder or particles.

17. The member according to claim 15 or 16 wherein said inorganic material is selected from the group consisting of a metal oxide or silica.

18. An apparatus for producing ozone comprising
means defining a generating chamber in which ozone is generated from a stream of air or oxygen maintained at a substantially constant pressure in the stream's flow through the chamber,
and an ozone generating means in said chamber, including a high tension electrode, a grounded electrode mounted in a spaced relation to said high tension electrode and a dielectric member provided on the surface of one of the electrodes facing the other electrode, said dielectric member including a layer of thermally insulating elastomeric material having particles of inorganic material covering the surface of the layer of said elastomeric material.

19. The apparatus according to claim 18 wherein said high tension electrode is in the form of a cylindrical tube.

20. The apparatus according to claim 18 wherein said high tension electrode is in the form of a hollow tube and said dielectric member is in the form of a cup mounted on the end of said tube.

* * * * *